P. S. TARTT & G. F. WILSON.
CULTIVATOR.

No. 192,029. Patented June 12, 1877.

UNITED STATES PATENT OFFICE.

PEMBROKE S. TARTT AND GEORGE F. WILSON, OF WINGO'S STATION, KY.

IMPROVEMENT IN CULTIVATORS.

Specification forming part of Letters Patent No. 192,029, dated June 12, 1877; application filed November 13, 1876.

*To all whom it may concern:*

Be it known that we, PEMBROKE S. TARTT and GEORGE F. WILSON, of Wingo's Station, Graves county, Kentucky, have invented new and useful Improvements in Cultivators; and that the following is a full, clear, and exact description of the same, having reference to the accompanying drawings, wherein—

Figure 1:
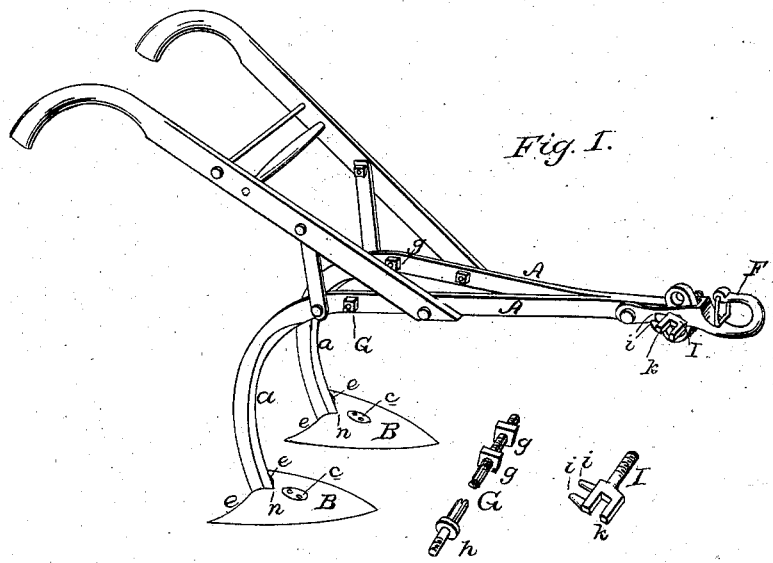
Figure 2:
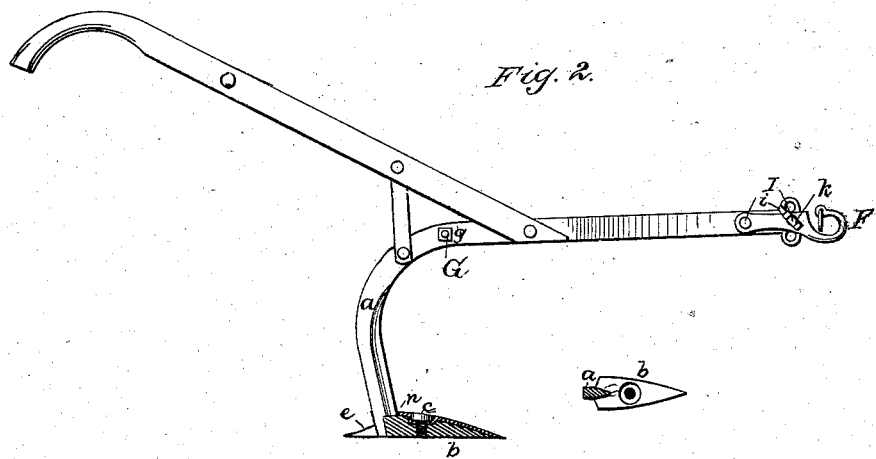
Figure 3:
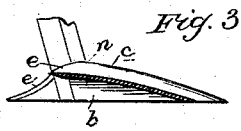

Figure 1 is a perspective view of our improved cultivator. Fig. 2 is a longitudinal section through the cultivator shovel and standard. Fig. 3 is a longitudinal section of the shovel, showing its sharp rear edge.

The object of our invention is to apply to grass-land and to young growing broadcast cereal crops—such as wheat, &c.—a treatment of sub-surface cultivation, whereby the soil may be loosened without being broken up or the surface inverted, and the air and its moisture may obtain access to the roots of the growing plants. This treatment is chiefly useful when the surface has become baked or indurated by the heat of the sun, and experience, both as to wheat and grass, has shown that by said treatment the yield may be greatly increased.

That others may fully understand our invention, we will particularly describe it.

We construct the cultivator-frame with two wrought-iron beams, A A, joined at their front ends, and diverging as they extend backward. At their rear ends they are curved downward edgewise to form standards $a$ $a$, to the lower ends of which the shovels B B are fixed. The standards $a$ $a$ are made sharp along the front edges of their upright portions, so as to cut through the soil or sod easily. The extreme lower portions of said standards form solid horizontal feet $b$ $b$, having circular depressions in their upper sides, and tapped holes in said depressions to receive the bolts $c$ $c$. This is necessary, because there can be no projection below the bottom surface of the foot $b$, and it is therefore impossible to employ separate nuts. The shovels B are formed up out of sheet-steel, and have cells or seats for the bolt-heads punched up. These cells form projections on the under side, which fit into the above-mentioned cells in the feet $b$, and the holding-bolts $c$ $c$ go down through the centers of the same. By this arrangement the holding-bolt is relieved from all shearing strain, and is therefore proportionately more efficient. The upper surface of shovel is also smooth and flush with the bolt-head, so that there is no projection, either above or below, to obstruct the forward movement of the plow through the soil. The heads of the bolts $c$ $c$ are circular, and fit pretty closely the cells in which they are seated, and are each provided with two holes for the application of a pin-wrench. The depth at which the shovels B will run beneath the surface will be determined by the setting of the clevis F, which is therefore made adjustable vertically, as usual.

While using the cultivator it frequently happens that an immovable obstacle is encountered beneath the soil, and the cultivator can only be liberated by pulling it backward. In sod thickly set with roots, as it will be in good land, this operation will be attended with difficulty, and require a considerable exercise of force, unless the rear edges of the shovels are made sharp, so as to cut their way out backward. We therefore make said shovels arrow-head in shape, with sharp points at the rear extremities and sharp edges $e$ $e$ between, so that in withdrawing the shovels may, with comparative ease, penetrate and sever the sod. The arrow-head or barbed form of the shovels B serves another purpose, which is useful and important, viz., the central notch $n$ in the rear edge of the shovel receives the forward edge of the standard $a$, and the said shovel has therefore two points of support to prevent a lateral displacement, with only a single bolt.

It is sometimes desirable to vary the distance between the shovels, and I therefore place between the beams A A, at their rear portion, a brace-rod, G, at one end of which there is a screw-thread and two nuts, $g$ $g$, fitted thereon. When in position one of these nuts, $g$, is at the inner side, and one at the outer side, of the beam A, so that, by moving said nuts outward or inward along said rod, said beams may be correspondingly moved away from or toward each other. The opposite end of said rod G is fitted with a collar, $h$, and a square portion fitted to a corresponding hole in the beam, and a screw-nut on the outer end to secure the same in place. The square portion of the rod G prevents any turning of the same when the nuts $g$ $g$ are being turned to adjust the beams A A.

It is desirable that all the operations of adjustment should be effected without the employment of tools not forming a part of the instrument. We therefore make the clevis-pin I with a monkey-wrench, $k$, on its head, fitted for the several bolt-nuts whereby the parts of the cultivator are united, and on one side of said monkey-wrench we place the two parallel pins $i$ $i$, fitted to the pin-holes in the nuts $g$ $g$. The shank of the pin I is cut with a screw-thread, which fits a female screw in one side of the clevis, so that when said pin is in place it can only be detached by unscrewing—an operation not likely to be effected except by design.

Having described our invention, what we claim as new is—

1. A cultivator constructed with standards $a$ $a$, sharpened on their front edges, and provided with horizontal flat feet $b$ $b$, combined with shovels B B, slightly convex transversely, and with edges on a horizontal plane, as and for the purpose set forth.

2. The shovels B B, of the form described and shown, with sharp rear edges $e$ $e$, as and for the purpose set forth.

3. The horizontal flat feet $b$ $b$, having depressions or cells in the upper surfaces, with tapped screw-holes in said cells, combined with the shovels B B, having projection on the under side to fit said depressions, and cells on the upper side to receive the flush heads of the holding-bolts $c$ $c$, whereby both upper and under surfaces are smooth and unobstructed, and the bolts $c$ $c$ are relieved of all shearing strains.

P. S. TARTT.
G. F. WILSON.

Witnesses:
H. H. HOBSON,
R. J. DUDLEY.